S. E. & W. W. MORRAL.
BUTT CUTTER MECHANISM FOR CORN HUSKING MACHINES.
APPLICATION FILED DEC. 23, 1909.
1,121,936.
Patented Dec. 22, 1914.
5 SHEETS—SHEET 3.
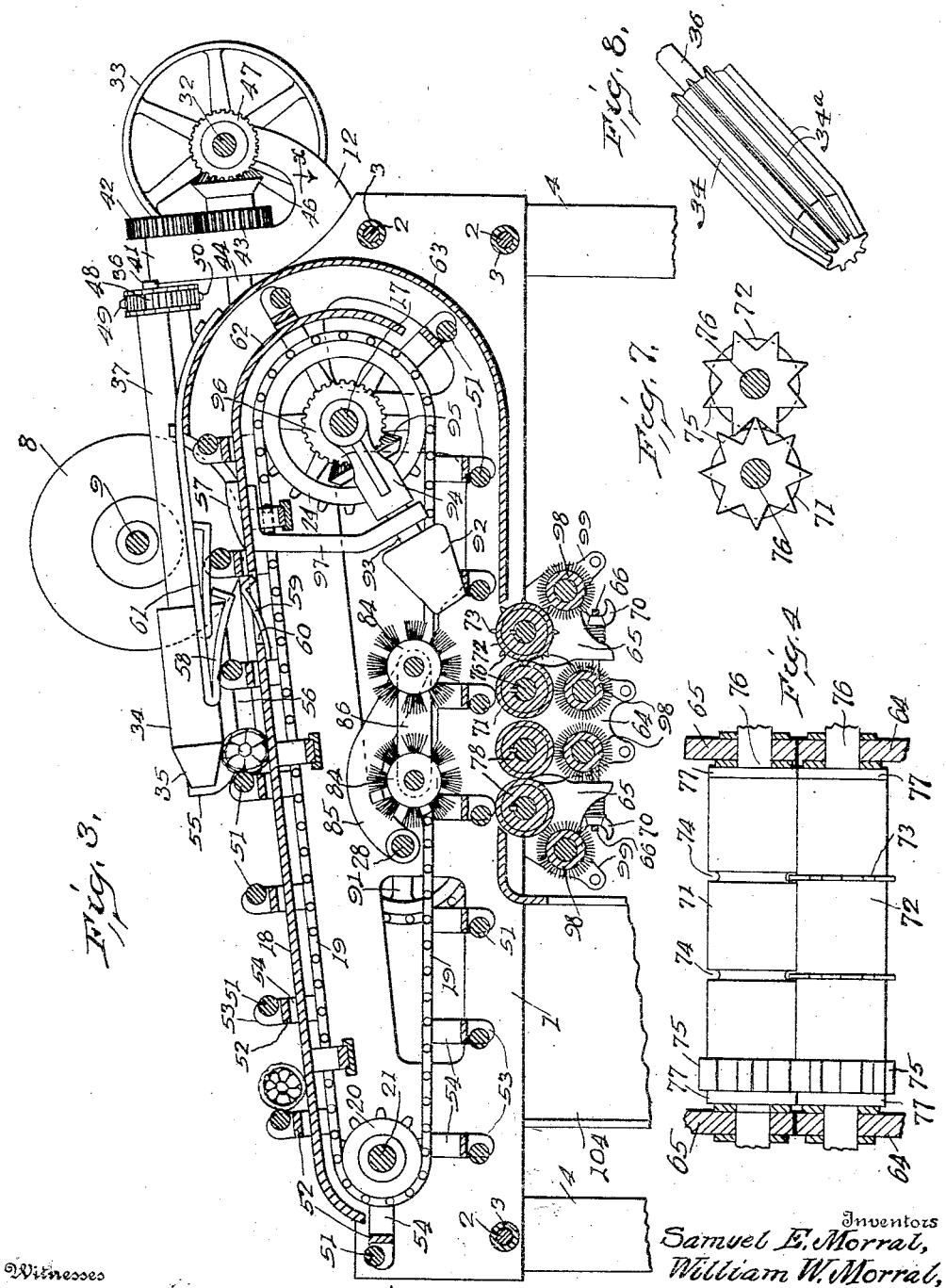
Witnesses
G. Howard Walmsley.
Edward S. Reed.
Inventors
Samuel E. Morral,
William W. Morral,
By
Attorney

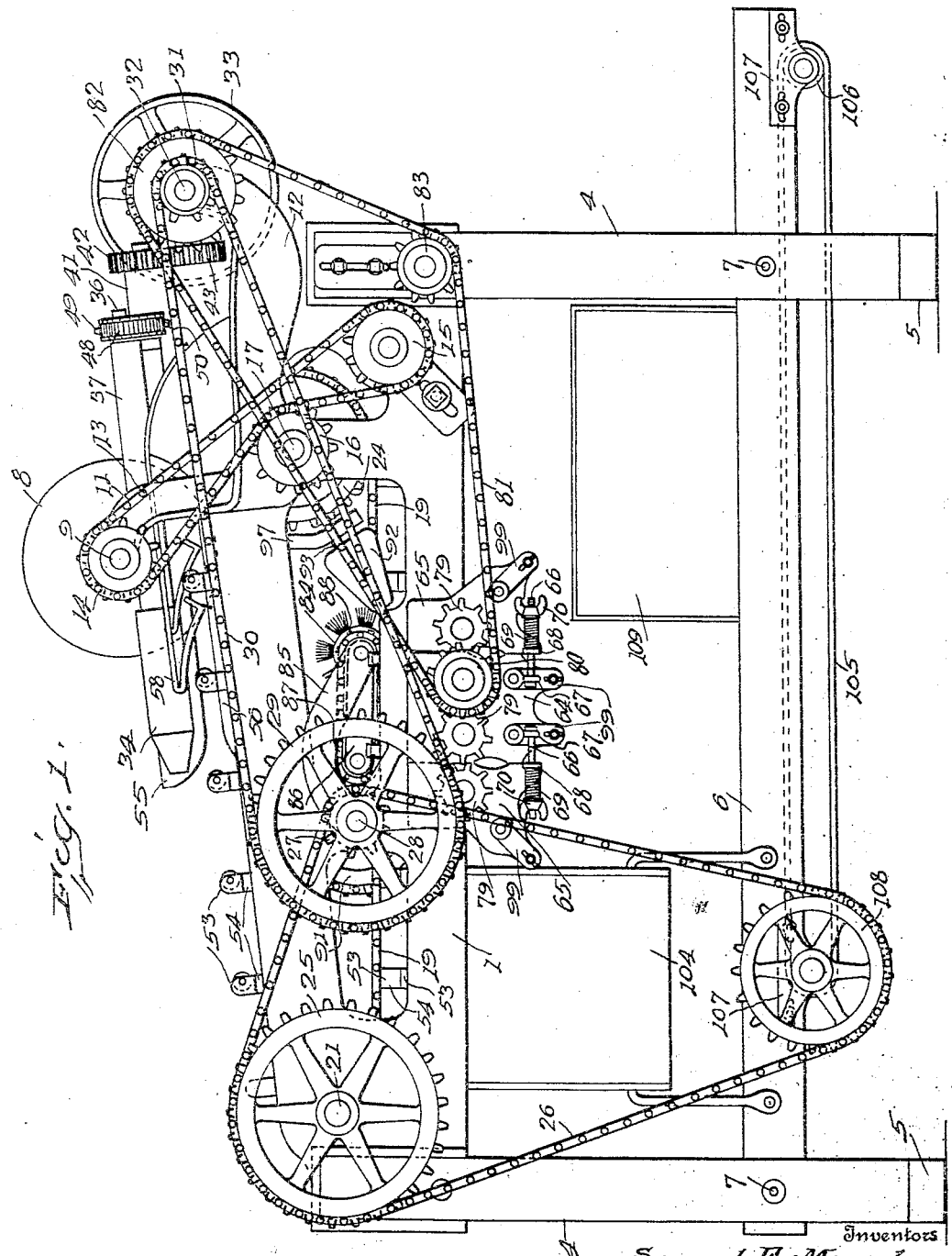

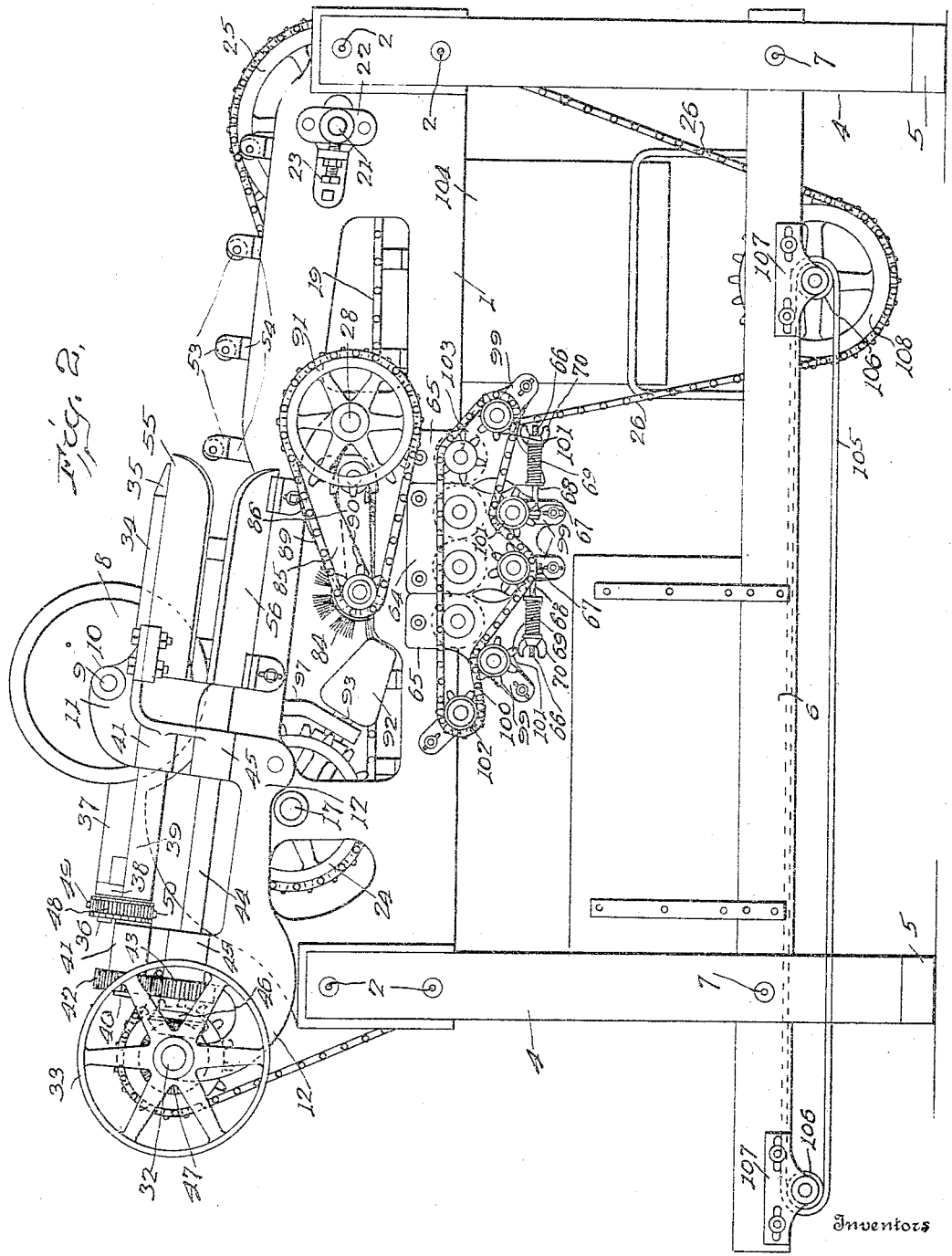

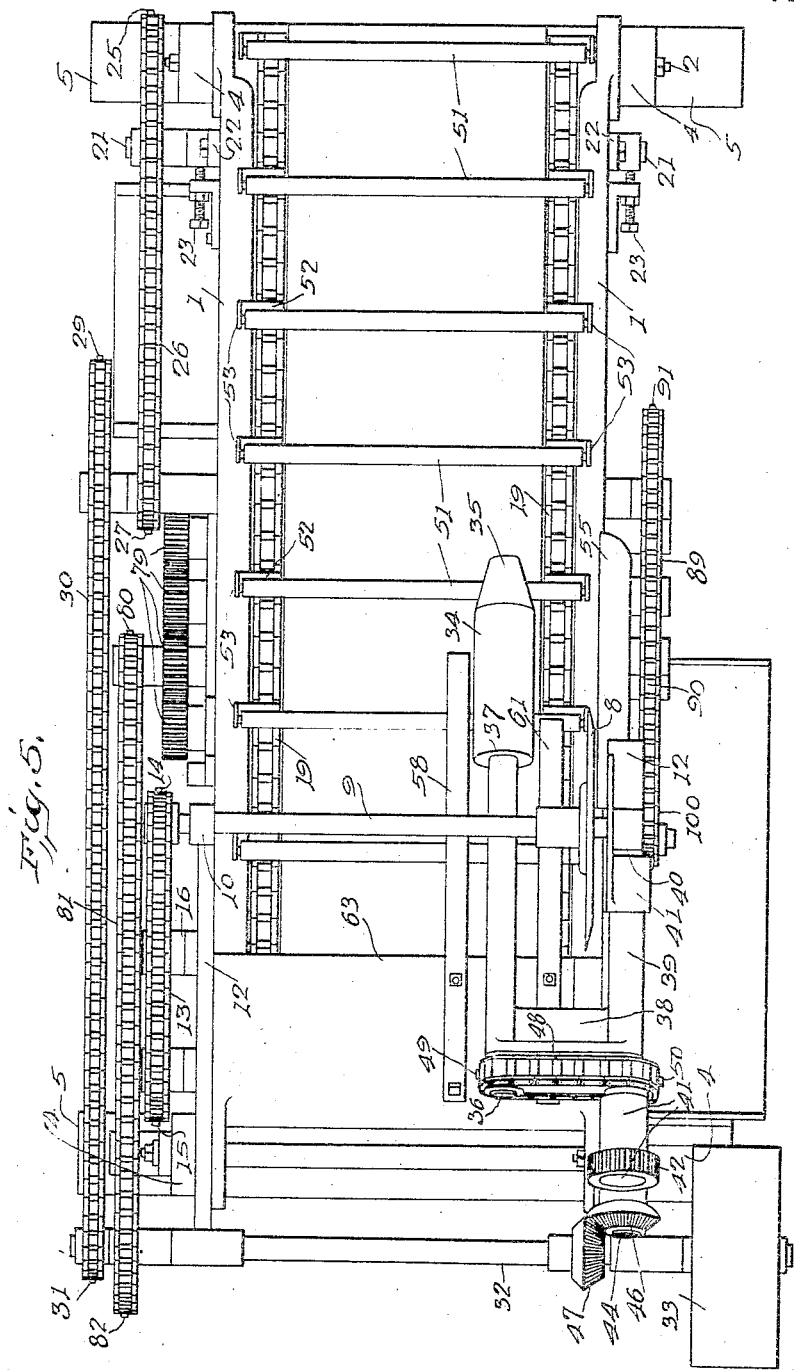

S. E. & W. W. MORRAL.
BUTT CUTTER MECHANISM FOR CORN HUSKING MACHINES.
APPLICATION FILED DEC. 23, 1909.
1,121,936.
Patented Dec. 22, 1914.
5 SHEETS—SHEET 5.
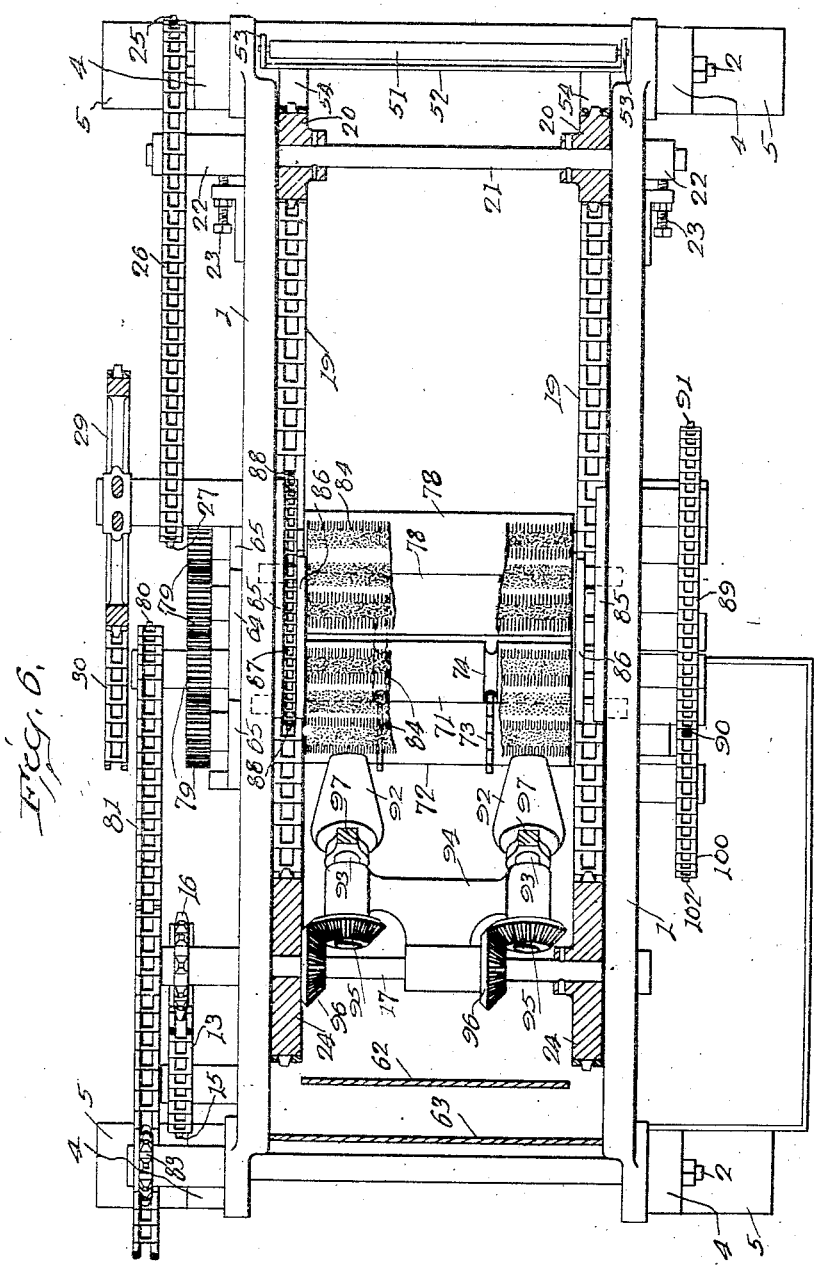
Witnesses
G. Howard Walmsley.
Edward Reed.
Inventors
Samuel E. Morral,
William W. Morral,
By H. A. Toulmin.
Attorney

UNITED STATES PATENT OFFICE.

SAMUEL E. MORRAL AND WILLIAM W. MORRAL, OF MORRAL, OHIO.

BUTT-CUTTER MECHANISM FOR CORN-HUSKING MACHINES.

1,121,936.

Specification of Letters Patent.

Patented Dec. 22, 1914.

Application filed December 23, 1909. Serial No. 534,583.

*To all whom it may concern:*

Be it known that we, SAMUEL E. MORRAL and WILLIAM W. MORRAL, citizens of the United States, residing at Morral, in the county of Marion and State of Ohio, have invented certain new and useful Improvements in Butt-Cutter Mechanism for Corn-Husking Machines, of which the following is a specification, reference being had therein to the accompanying drawings.

This invention relates to corn husking machines.

The object of the invention is to provide a single machine of compact arrangement which will receive an ear of green corn as it comes from the stalk, sever the butt therefrom, remove the husk and silk and deliver the ear in condition to go to the cutting machine.

To this end it is a further object of the invention to so construct and arrange the butt-removing mechanism and the husking mechanism that the ear of corn will be successively acted upon by said mechanisms and will be maintained in a position to be properly engaged by both of said mechanisms; further, to so arrange said mechanism that a single feeding device will receive the ear of corn, present the same to the several operating mechanisms and deliver the husked and cleaned ear to the discharge chute; to so construct the husking mechanism that parts thereof will constitute the silk removing devices, which devices will act upon the ear simultaneously with the husking mechanism; and further, to so construct the machine as a whole that the ears of corn will be fed to the several operating devices and maintained in proper relation thereto without the use of gripping devices, thereby simplifying the construction and operation of the machine and rendering the same less liable to disarrangement or breakage.

In the accompanying drawings, Figure 1 is a side elevation of a combined butt-removing and husking machine embodying our invention; Fig. 2 is a side elevation of that side of such a machine opposite the side shown in Fig. 1; Fig. 3 is a longitudinal, sectional view taken through the upper portion of such a machine; Fig. 4 is a detail plan view of the husking rollers: Fig. 5 is a top plan view of the machine; Fig. 6 is a horizontal, sectional view, taken on the line *x x* of Fig. 3; Fig. 7 is an end elevation of the rollers shown in Fig. 4; and Fig. 8 is a detail view of a modified form of the holding roller.

In these drawings we have illustrated one embodiment of our invention and have shown the same as comprising a main frame consisting of side members 1 connected one to the other by transverse bolts or bars 2 having mounted thereon spacing sleeves 3, which sleeves are arranged between the side members 1. This main frame is supported by standards or legs 4 which are secured to the respective side members 1 by means of the bolts 2 and are mounted at their lower ends upon supporting blocks or transversely extending bases 5 which serve to tie together the legs of each pair, that is, the two legs at each end of the machine. Longitudinally extending side members or bars 6 are secured to the legs on the respective sides of the machine by means of bolts 7 and serve both to connect together the legs on the same side of the machine and to form a support for certain parts of the mechanism to be hereinafter described.

The butt-removing mechanism is preferably mounted on the upper portion of the main frame and between the ends thereof. This mechanism is here shown as comprising a butt-removing device, such as a rotary cutter 8 mounted on a shaft 9 extending transversely to the main frame and journaled in bearings 10 arranged at the opposite sides thereof. In order that the rotary cutter may be of a proper diameter and supported in a proper relation to the main frame the bearings 10 are preferably formed in upwardly extending arms or portions 11 of brackets 12 which are rigidly secured to the respective side members of the main frame. The shaft 9 and the rotary cutter are driven by means of a sprocket chain 13 which extends about a sprocket wheel 14 secured to the shaft 9, about a second sprocket wheel 15 adjustably mounted on the adjacent side member of the main frame and over a third sprocket wheel 16 carried by a shaft 17, to which motion is imparted in a manner hereinafter described. The ears of corn are fed to the rotary cutter 8 along the upper surface of a bed-plate or table top 18 which is arranged between the two side members of the main frame near the upper edges thereof and extends for a considerable portion of the length of said main frame. The ears of corn are placed on this bed-plate and are carried over the same by means of suitable feeding mechanism, which, as here shown, comprises an endless carrier consisting of two sprocket chains 19, one of which is arranged near each side member of the main frame. The sprocket chains 19 extend about sprocket wheels 20 mounted on a shaft 21 journaled in the main frame near one end of the plate 18, the two sprocket wheels 20 being arranged near the opposite side members of the main frame. The shaft 21 is preferably journaled in adjustable bearings 22, the adjustments of which are accomplished by means of set screws 23. The sprocket chains 19 also extend about sprocket wheels 24 mounted on the shaft 17 near the opposite end of the bed-plate 18. Motion may be imparted to the endless carrier in any suitable manner, but we have here shown the shaft 21 carrying the sprocket wheels 20 as having mounted on one end thereof a sprocket wheel 25, about which extends a sprocket chain 26. This sprocket chain also extends about a sprocket wheel 27 mounted on a stud shaft 28, to which motion is imparted by means of a second sprocket wheel 29 about which extends a sprocket chain 30, which also extends about a sprocket wheel 31 mounted on a driving shaft 32 journaled in suitable bearings carried by the brackets 12 which are mounted upon the main frame. Motion may be imparted to this shaft in any suitable manner. In the present instance it is shown as having a belt wheel 33, by means of which it may be driven from a suitable power mechanism.

Supported by the two chains 19 at a point removed therefrom and extending transversely to the main frame are suitable ear engaging devices, such as rollers 51. These rollers are preferably connected to the chains by journaling the same in suitable brackets, which, as here shown, comprise transverse bars 52 of a length greater than the distance between the chains 19 and having their ends upturned to form lugs 53 in which the rollers 51 are journaled. The rollers are mounted in the lugs 53 in such a position that they will extend in front of the transverse bars 52. These bars or brackets 52 are connected to the chains 19 by means of links or arms 54 which are rigidly secured to the bars 52 and are connected at their opposite ends to the chains 19. These links or arms are of such a length that the brackets and the rollers carried thereby will be supported at such a distance from the chains as to cause both the bracket and the roller to extend above the bed-plate or support 18.

The ear of corn is moved along the bedplate or fixed support 18 toward the rotary cutter 8 and is engaged by a positively actuated means for moving the same transversely of the fixed support to bring the butt-end of the ear into such a position that the proper portion thereof will be removed by said cutter. In the present instance this positively actuated means comprises a roller 34 arranged longitudinally of the main frame, preferably near that side thereof on which the rotary cutter is mounted and having its forward end tapered, as shown at 35, to permit the ear of corn to more readily pass beneath the same. This roller may have a smooth friction surface which will engage the ear or it may be provided with longitudinal ribs, as shown in Fig. 8. In order that the roller may accommodate itself to ears of different sizes and may exert a proper amount of pressure on each ear it is so mounted as to have a free vertical movement and the weight of the roller and the parts which move with it are sufficient to exert the necessary amount of pressure on the ear to cause the same to be moved by the rotation of the roller. Yet this weight is not sufficient to crush the grain or in any way injure the ear of corn. To this end the roller is mounted on a shaft 36 which extends rearwardly therefrom through a sleeve 37 forming a part of a casting 38 which also comprises a second sleeve 39 arranged substantially parallel with the sleeve 37 and loosely mounted on a shaft 40, which shaft is journaled in bearings 41 carried by the bracket 12. The shaft 40 is provided at its outer end with a gear 42 which meshes with a second gear 43 mounted on a shaft 44 journaled in bearings 45 arranged on the bracket 12 at points beneath the bearings 41. The outer end of the shaft 44 has mounted thereon a bevel gear 46 which meshes with a second bevel gear 47 mounted on the drive shaft 32. Thus, the shafts 44 and 40 are rotated from the drive shaft 32 and motion is imparted from the shaft 40 to the shaft 36, carrying the roller 34 by means of a sprocket chain 48 which extends about sprocket wheels 49 and 50 mounted on the shafts 36 and 40, respectively.

The amount of movement imparted to the ear by the roller 34 is limited by means of suitable guides, which, in the present instance, comprise two plates 55 and 56 supported by the bracket 12 and one of the frame members 1, respectively. These plates extend parallel one with the other and are spaced apart a distance sufficient to permit the butt of the ear to enter the space between them but are arranged to engage and form a stop for the end of the ear proper. These plates or guides extend beyond the adjacent edge of the cutter 8 and have their opposite ends flared to facilitate the entrance of the end of the ear. The lower plate 56 is preferably adjustable to enable the space between the two plates to be varied. The flared ends of the guides or plates 55 and 56 are here shown as extending a slight distance beyond the adjacent end of the roller 34, and, consequently, they are in a position to limit the movement of the ear as soon as it is engaged by the roller. Shearer bars 57 are secured to the main frame and extend a short distance above the level of the bed-plate or support 18 and serve to support the butt-end of the ear while the butt is being severed therefrom by the cutter and thus prevent the ear from tipping as it would otherwise do owing to the tapered shape thereof.

As the ear is carried along the bed-plate or support 18 by the feed rollers 51 and is brought into engagement with the edge of the cutter 8 there is a tendency on the part of the tip of the ear, that is, the end opposite the butt, to move away from the roller and to turn at an acute angle to the cutter 8, this being due to the tapered shape of the ear and the resistance offered by the cutter to the forward movement of the ear. This turning of the ear results in causing the ear to bind upon the cutter, prevents the cutter from making a square cut and so displaces the ear that it is discharged from the butt-removing mechanism in an improper position for presentation to the husking mechanism. In order to overcome this tendency of the ear to turn when the butt is engaged by the cutter we have provided means for resisting the forward movement of the tip of the ear, this resistance being sufficient to maintain the ear substantially parallel with the feed roller. As here shown this resistance is offered by means of a spring 58 which is secured to a fixed part of the machine and extends to a point beyond that point at which the ear is engaged by the cutter and has its forward portion bent upon itself so that it extends downwardly and rearwardly. The forward end of the spring is normally at such a height as to permit the ear to pass beneath the same and the downwardly extending portion thereof exerts a steady pressure on the ear, which increases as it is fed against the cutter. To better resist the movement of the tip of the ear we prefer to provide a second spring 59 arranged immediately beneath the spring 58 and coöperating therewith. This is accomplished by forming an opening 60 in the bed-plate or support 18 at a point beneath the spring 58 and securing the spring 59 to the lower side of the bed-plate on the forward side of the opening 60 and causing the free end of said spring to extend upwardly and rearwardly through the opening. Thus, the two springs 58 and 59 engage the ear on the opposite sides thereof and offer a resistance to the forward movement thereof which is uniform on both the top and bottom of the ear, thus preventing the ear from tipping. We have also found it desirable to provide still another spring to engage the ear as it leaves or is about to leave the springs 58 and 59. This spring is here shown at 61, is of a shape similar to that of the spring 58 and is so supported as to engage the ear at a point between the spring 58 and the cutter and thus maintain the ear in its proper relation to the feed roller until the butt is completely severed and the cutter no longer offers resistance to the forward movement of the ear.

The husking mechanism is located at a point beyond the butt-removing mechanism and is arranged to receive the ear of corn after the butt has been removed therefrom. In the present instance we have shown the corn husking mechanism as supported from the main frame at a point beneath the butt-removing mechanism. We have also shown a chute or guideway leading from the butt-removing devices to the husking devices, and mechanism for positively moving an ear of corn through the chute and delivering the same to the husking mechanism. This chute is preferably formed by curving the rear end of the bed-plate 18 downwardly, as shown at 62, and arranging a curved guide plate 63 at a point sufficiently removed from the curved end 62 of the bed-plate to permit the ear of corn to pass between the two plates. In the present instance this curved plate extends from a point immediately in the rear of the rotary cutter, about the end of the feed belt where it passes over the sprocket wheel 24 and to the husking mechanism. The lower portion of the plate, that is, the portion adjacent to the husking mechanism, is preferably flat, as shown in Fig. 3. The feed mechanism for positively moving the ear of corn through this chute is, in the present instance, the same feed belt that conveys the ear of corn to the butt-removing devices, the chute being so arranged that the feed rollers 51 pass through the chute and convey the corn to the husking mechanism. Obviously, if the ear of corn were carried to a point beyond the butt-removing device and discharged into the chute it would pass through the same by gravity, but, in doing so it would twist and turn until, when it reached the lower end of the chute and was ready to be delivered to the husking mechanism, it would be liable to occupy a position such that the husking mechanism would not properly act on the same. By employing the positive feed mechanism this difficulty is overcome. Of course, after the ear of corn has passed into the chute it will drop away from the feed roller which has been conveying it and will move through the chute by gravity, but this movement is limited by the next preceding feed roller and the space between the two rollers is such that the ear will not turn or twist to any material extent in passing from one to the other. The ear will follow the preceding feed roller through the chute until it reaches the lower extremity of the curved portion of the chute, at which point the ear will cease to move by gravity and will come to a stop until it is engaged by the feed roller which follows it. This roller will move the ear along the flat portion of the chute and will cause the same to assume a position substantially parallel with the feed roller, in which position it is delivered to the husking mechanism and is properly acted upon to remove the husk therefrom.

The husking mechanism, as here shown, consists of a plurality of pairs of husking rollers, the rollers of each pair being rotated in opposite directions so that they will pinch the husk between them and pull it from the ear. In the present construction we have employed two pairs of these rollers or four rollers in all. The two central rollers, or the inner roller of each pair, are journaled in plates 64 which are rigidly secured to and depend from the two side members of the main frame. The outermost rollers are journaled in plates 65 which are pivotally connected at their upper ends to the opposite side members of the main frame and are resiliently connected at their lower ends to the plate 64, this connection preferably comprising, in each instance, a bolt 66 extending through a lug 67 on the plate 64 and through a corresponding lug 68 on the pivoted plate 65. A spring 69 is coiled about the bolt 66 and confined between the lug 68 and a nut 70. The tension of this spring tends to hold the outermost roller of each pair in contact with the innermost roller of the corresponding pair, but permits the rollers to move apart sufficiently to allow the husks to pass between the same. In this manner we secure a strong gripping effect by the rollers without liability of choking the rollers with husks. The husking rollers may, of course, be of any suitable construction, but in the construction here shown, they are made up of a plurality of sections or cylinders of iron covered with rubber. The first pair of rollers, comprising the individual rollers 71 and 72, are provided with special means for loosening the husk on the ear. To this end the sections of iron and rubber of the roller 72 are spaced apart and have arranged between them toothed disks or star wheels 73, while the roller 71 is provided at points in alinement with the toothed disks 73 with grooves 74 adapted to receive the teeth of the disk 73. It will be apparent that the toothed disks will tear and loosen the husk on the ear in such a manner as to enable the rubber covered portions of the rollers to more readily grip the same. Further, the rollers 71 and 72 are provided at one end with intermeshing toothed disks 75, which disks are adapted to engage the tip of the ear and tear the husk loose therefrom. The several sections comprising each roller are mounted upon shafts 76 which are journaled in the plates 64 and 65 and have arranged between the inner face of the plate and the ends of the roller collars 77 which serve to retain the sections in their positions on the shaft and also form supports for the lugs 53 in which the bearing rollers 51 of the feed belt are mounted, and thus prevent the feed rollers coming in contact with the teeth or with the husking rollers should the feed belt become slack. A second pair of rollers 78 are built up merely of sections of rubber covered iron and serve to remove those portions of the husks which are not taken off by the first pair of rollers. Movement may be imparted to these rollers in any suitable manner, but we have here shown the shaft of each roller as extending beyond the supporting plate at one side of the machine and provided with a pinion 79, the pinions of the adjacent rollers intermeshing. One of these shafts, preferably the shaft of the roller 71, extends beyond the pinion and has mounted thereon a sprocket wheel 80, about which extends a sprocket chain 81 which also extends about a sprocket wheel 82 on the drive shaft 32. This sprocket chain also extends about an idle sprocket wheel 83 adjustably mounted on the main frame and serving both as a guide and as a tightener for the chain.

Suitable devices are arranged above the husking rollers of each pair to engage the ear of corn and hold the same firmly in engagement with the husking roller and to rotate the same while it is in engagement with these rollers. These devices preferably consist of rotary members, such as the rotary brushes 84, one of which is supported above each pair of husking rollers and preferably has its axis arranged between the vertical planes of the axes of the two husking rollers constituting the pair. In order that the rotary members or brushes may accommodate themselves to ears of varying thickness and may exert a uniform pressure on the ears they are so mounted as to be capable of a vertical movement. To accomplish this the first brush, in the order in which they are encountered by the ear, is journaled in the ends of a pair of parallel arms 85 which extend rearwardly from the shaft 28, on which they are pivotally mounted. The second brush 84 is journaled in the forward ends of a second pair of arms 86 which are pivotally mounted upon the shaft of the first brush 84. The two brushes 84 are connected one to the other by means of a sprocket chain 87 extending about sprocket wheels 88 mounted on the shafts of the respective brushes. The first brush 84 is positively rotated by means of a sprocket chain 89 extending about a sprocket wheel 90 on one end of the shaft of the brush and about a second sprocket wheel 91 mounted on the shaft 28. In this manner the brushes are positively rotated and serve not only to hold the ears of corn in engagement with the husking rollers and to rotate the ears of corn but also serve to remove the silk from the ears of corn after the husks have been removed. The brushes engage the ear and remove the silk therefrom simultaneously with the action of the husking rollers, the brush engaging the silk as soon as the rollers have pulled the husk from the ear sufficiently to expose the silk.

As above stated, the husking rollers of the first pair are provided with two intermeshing toothed disks 75 which assist in loosening and tearing off the husks from the ears by engaging this husk near the tip of the ear. Inasmuch as the ears vary in length and all of the ears have been moved to the opposite side of the main frame in order that the butts may be removed therefrom, it is desirable that some means should be provided for moving the ear toward those ends of the rollers having the toothed disks 75, thereby enabling these disks to engage the tip of the ear. For this purpose we have mounted at a point adjacent to the first pair of husking rollers two tapered rollers which are supported in such a position as to engage the ears of corn and move the same toward that side of the machine opposite the cutter 8. These tapered rollers are shown at 92 and each roller is provided with a shaft 93 which extends through a longitudinal bearing formed in a bearing bracket 94, which bearing bracket has also a transverse bearing, by means of which it is pivotally supported on the shaft 17. That end of the shaft 93 which extends beyond the longitudinal bearing of the bracket 94 has secured thereto a bevel pinion 95 which meshes with a second bevel pinion 96 secured to the shaft 17. The shaft 93 of the roller extends through the slotted lower end of the bracket 97 which serves to limit the downward movement of the roller, but permits the roller to rise and fall and thus accommodate itself to the various sizes of ears. The two rollers may be arranged in any desired position, but we prefer to arrange them near the opposite side members of the main frame.

Suitable means are also provided for removing the silk and bits of husk from the husking rollers and maintaining the same free from obstructions of this character. This means preferably comprises a plurality of rotary brushes 98 which have their shafts journaled in brackets 99 which are mounted on the bearing plates in which are journaled the shafts of the husking rollers. These brushes are rotated by means of a sprocket chain 100 extending about sprocket wheels 101 secured to the ends of the shafts of the respective brushes and also extending about an idle sprocket wheel 102 adjustably mounted on the main frame and a sprocket wheel 103 secured to the shaft of the outer husking roller of the last pair.

The endless feed belt which has conveyed the ears of corn through the butt-removing mechanism, through the chute and across the husking rollers, discharges the same into a chute 104, which, in turn, delivers the husked ear into a receptacle or into a suitable conveyer, as may be desired. The husks drop from the husking rollers onto an endless belt conveyer 105 which extends about drums or rollers 106 having their shafts journaled in brackets 107 which are adjustably mounted on the longitudinal side members 6. One of these shafts, that near the forward end of the machine, has a sprocket wheel 108 about which extends the sprocket chain 26 which also extends about the sprocket wheel 25 of the shaft 21 and the sprocket wheel 27 of the shaft 28. The butts which are severed by the rotary cutter drop into a chute 109 and are also delivered to the conveyer 105 which extends beyond the main frame at one end.

The operation of the machine as a whole will be readily understood from the description of the operation of the several parts thereof, and it will be apparent that the construction and arrangement of the several parts comprising the machine is such that an ear of corn is successively presented to the butting and husking devices in a proper position to enable those devices to act thereon; that the ears of corn are positively fed through the machine and presented to the butting and husking devices and maintained in proper engagement with those devices by means of a continuous feed mechanism which engages the loose ears without the necessity of employing gripping carriers. Further, it will be apparent that means are provided for maintaining the ear substantially parallel with the feeding roller while it is in engagement with the butt-removing device, thus retaining the ear in its proper position relative to said butt-removing device. It will also be apparent that means are provided for holding the ear in engagement with the husking rollers, rotating it while in such engagement and for removing the silk therefrom while it is in engagement with the husking rollers.

We wish it to be understood that we do not desire to be limited to the details of construction shown and described, for obvious modifications will occur to a person skilled in the art.

Having thus fully described our inven- tion, what we claim as new and desire to secure by Letters Patent, is:—

1. A machine of the character described comprising a support for an ear of corn, a butt-removing device arranged adjacent to said support, a guide extending along said support and leading to said butt-removing device, means to feed said ear of corn along said support toward said butt-removing device, a device separate from said feeding means to hold said ear of corn against said guide, and a device supported independently of said feeding means and said supporting device and arranged to engage the tip of the ear to prevent the same from moving forward relatively to said feeding means.

2. A machine of the character described comprising a support for an ear of corn, a butt-removing device arranged adjacent to said support, a guide extending along said support and leading to said butt-removing device, means to feed said ear of corn along said support toward said butt-removing device, a device separate from said feeding means to hold said ear of corn against said guide, and a yielding member arranged above the path of said ear of corn and extending forwardly and downwardly in a position to be engaged by the tip of said ear to hold the ear against movement about either a vertical axis or a transverse horizontal axis when the butt is engaged by said butt-removing device.

3. A machine of the character described comprising a support for an ear of corn, a butt-removing device arranged adjacent to said support, a guide extending along said support and leading to said butt removing device, means to feed said ear of corn along said support toward said butt-removing device, a device separate from said feeding means to hold said ear of corn against said guide, and a pair of yielding members arranged above and below the supporting surface of said support in substantially the same vertical plane and converging forwardly into the path of said ear of corn, whereby the converging ends of said members will be engaged by said ear of corn and resist the movement of said ear relatively to said feeding means when the butt of the ear is engaged by said butt-removing device.

4. In a mechanism of the character described, the combination, with a butt-removing device, a guide, and a feeding member for moving an ear of corn along said guide toward said butt-removing device, of a pair of converging springs adapted to receive said ear of corn between them and to offer resistance to the forward movement of that end of said ear opposite the end engaged by said butt-removing device, and another spring arranged beyond said pair of springs and adapted to engage said ear after it has been disengaged from said pair of springs.

5. A machine of the character described comprising a fixed and substantially flat supporting surface for an ear of corn, a butt-removing device arranged adjacent to said supporting surface, a conveyer to move an ear of corn over said support to said butt-removing device comprising a carrier arranged below said supporting surface and having an ear-engaging member arranged above said supporting surface and connected with said carrier, and a device arranged above and coöperating with said supporting surface to move said ear of corn transversely thereto while it is in engagement with said ear-engaging member.

6. A machine of the character described comprising a fixed and substantially flat supporting surface for an ear of corn, a butt-removing device arranged adjacent to said supporting surface, a device coöperating with said supporting surface to move said ear of corn transversely thereto and into a position to be acted upon by said butt-removing device, a conveyer comprising belts arranged on opposite sides of said supporting surface and below the plane thereof, arms carried by said belts, and ear-engaging members mounted on the respective arms and extending above and transversely to said supporting surface, whereby said conveyer can operatively engage an ear of corn of any length and move it longitudinally to said table without interfering with the transverse movement of said ear of corn.

7. A machine of the character described comprising a fixed and substantially flat support for an ear of corn, a device to operate on said ear of corn while it is carried by said support, a guide to position said ear with relation to said operating device, means to act on said ear of corn while it is on said support to move the same into engagement with said guide, a conveyer comprising belts on opposite sides of said support, ear-engaging members extending across said support and connected at the opposite ends thereof to said conveyer belts and adapted to engage the ears on said supports and move the same between said holding means and said support.

8. A machine of the character described comprising a fixed and substantially flat support for an ear of corn, a device to operate on said ear of corn while it is carried by said support, a guide to position said ear of corn with relation to said operating device, means arranged above said support to act on said ear of corn while it is on said support to move the same into engagement with said guide, a conveyer comprising two endless belts arranged on opposite sides of said support, a plurality of arms carried by each of said belts, and ear-engaging members mounted on the corresponding arms of said belts, extending above said support and adapted to be moved between said holding means and said support.

9. A machine of the character described comprising a device to operate upon an ear of corn, a table to support an ear of corn during the operation of said device and having one end curved downward at a point beyond said operating device, a feeding device to convey said ear of corn over said table to said operating device, and a curved plate coöperating with the curved end of said table to constitute a chute through which ears of corn are discharged after they have been acted upon by said operating device.

10. A machine of the character described comprising a device to operate upon an ear of corn, a supporting table to support said ear of corn during the operation of said device and having one end curved downward at a point beyond said operating device, a curved plate supported adjacent to the curved portion of said table and coöperating therewith to form a chute, and a conveyer comprising a belt and ear-engaging members carried by said belt and arranged to move over said supporting table and through said chute.

11. In a machine of the character described, a guide, a butt-removing device, a holding device comprising two coöperating members arranged to engage an ear of corn and hold the same in engagement with said guide, one of said coöperating members being fixed with relation to the other member and substantially flat to form a surface against which the ear of corn may bear and the other of said coöperating members having a feeding movement and being automatically adjustable toward and away from the other of said members, and feeding means comprising ear-engaging devices arranged to pass between said coöperating members to move said ear of corn along said guide.

12. In a machine of the character described, the combination, with a butt-removing device, a guide, a fixed support for an ear of corn, and positive means for moving an ear of corn along said guide and into engagement with said butt-removing device, of positively actuated means arranged above said support and coöperating therewith to hold said ear of corn against said guide while it is being moved along said support.

13. In a machine of the character described, the combination, with a butt-removing device, a fixed support for an ear of corn, and means for feeding said ear of corn along said support, of a guide comprising two substantially parallel members spaced apart to receive the butt-end of said ear between them, and means for positively holding said ear of corn in engagement with said guide.

14. In a machine of the character described, the combination, with a butt-removing device, a guide, a fixed support for an ear of corn, and feeding means for moving an ear of corn along said guide into engagement with said butt-removing device, of a positively actuated member arranged above said support and coöperating therewith to hold said ear of corn against said guide while it is being acted upon by said feeding means, said member being automatically adjustable relatively to said fixed support to enable it to accommodate itself to ears of different size.

15. In a machine of the character described, the combination, with a supporting table for an ear of corn, a butt-removing device supported adjacent to said table, a guide leading to said butt-removing device, and a feeding device for moving an ear of corn over said supporting table and into engagement with said butt-removing device, of a positively actuated holding roller arranged above said supporting table and arranged to engage said ear of corn to hold the same against said guide while it is being acted upon by said feeding means, said roller being free to move vertically to accommodate itself to ears of different size.

In testimony whereof, we affix our signatures in presence of two witnesses.

SAMUEL E. MORRAL.
WILLIAM W. MORRAL.

Witnesses:
C. J. SCHULTZ,
H. C. SCHULTZ.